United States Patent Office 3,578,431
Patented May 11, 1971

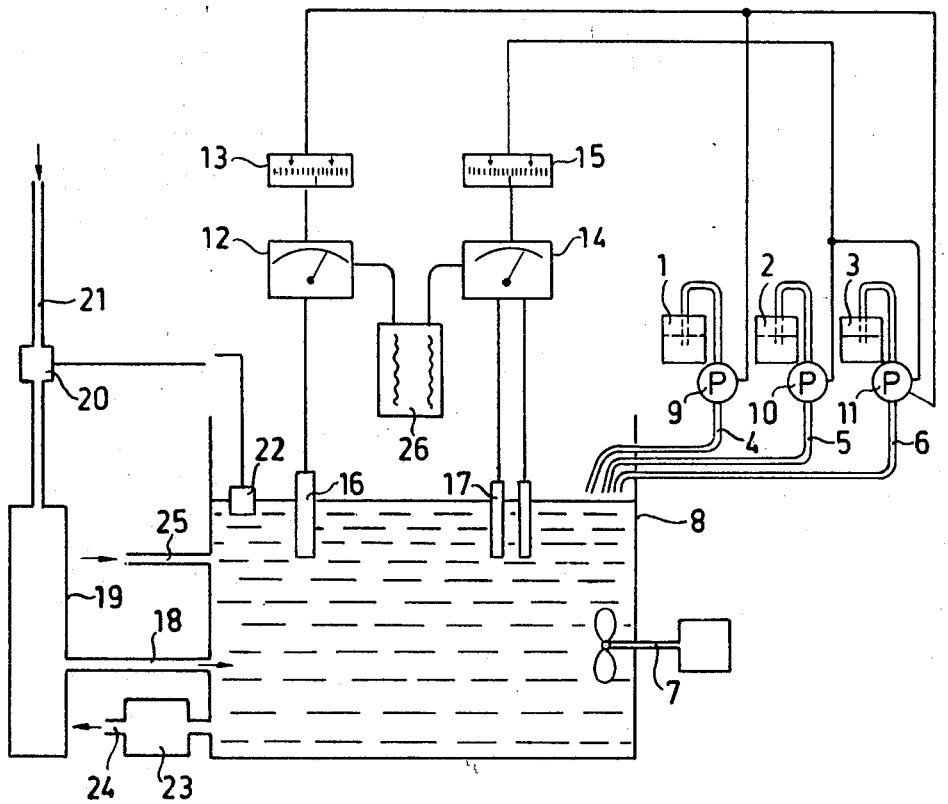

3,578,431
METHOD FOR AUTOMATICALLY SUPPLYING NUTRITIVE COMPOSITIONS TO PLANTS IN OPTIMUM AMOUNTS
Nils Torsten Ingestad, Stockholm, and Ernst Göran von Haartman, Lund, Sweden, assignors to Aktiebolaget Wallco, Stockholm, Sweden
Filed Sept. 30, 1966, Ser. No. 583,163
Claims priority, application Sweden, Oct. 1, 1965, 12,722
Int. Cl. A01g 9/00, 31/00
U.S. Cl. 71—1                                  4 Claims

ABSTRACT OF THE DISCLOSURE

Constant nutrient composition corresponding to predetermined nutrient proportions at optimum growth is automatically maintained in an aqueous cultivation medium for plants without the need for replacing the medium with a fresh solution. Mineral nutriment is supplied to the cultivation medium consisting essentially of water and a nutrient salt mixture in response to variations in hydrogen ion concentration and conductivity from at least three nutrient solutions, the first solution being alkaline and containing a portion of the nutrients, the second solution being acidic and containing a second portion of the nutrients, and the third solution containing the remainder of the nutrients.

---

The present invention relates to a method for maintaining a substantially constant nutritive composition of a cultivation medium so as to obtain a maximum production in the cultivation of plants, which preferably is carried out without the use of earth, by means of plant nutrient as described in the U.S. patent application Ser. No. 561,377, of which the present application is a continuation-in-part. The invention also relates to a device for carrying out the method.

In the U.S. application 561,377 there is described a method for stimulating the increment and/or the yield of plants by means of an admission of mineral nutrient and compositions therefor.

The purpose of the present invention is to provide a reliable and automatic dosage method for such a plant nutrient, in particular for the cultivation of plants in an extensive scale, e.g. in greenhouses or hothouses in which the administration of the plant nutrient hitherto generally has been performed by means of relatively complicated rules.

The fundamental requirement in the cultivation of plants where constant nutritive condition and maximum production have to be maintained is that the added quantity of plant nutrient corresponds to the consumption during growth, i.e. the replacement principle is practiced. This principle is followed as closely as possible all of the time and with minimum possible deviation. Further, secondary factors should not be permitted to influence the plants, e.g. extreme pH-values or salts or ions which are not necessary for the plants. To the utmost possible extent the cultivation medium should not be replaced if the conditions for a rigorous control of the plants are to be maintained. According to the present invention, a state of equilibrium in the system of root media/plant may be adjusted and maintained constantly without replacing the cultivation medium.

By means of the present invention one can fulfil all the requirements mentioned hereabove and with great exactness cultivate plants in, e.g. a water culture. This is accomplished without replacing the cultivation medium, and one attains considerably better results than by means of prior methods. According to the present invention this is obtained by automatically supplying the plant nutrient to the cultivation medium on the basis of the hydrogen ion concentration and the conductivity of the cultivation medium in such a way that the element proportions of the supplied plant nutrient (which preferably is divided into different nutrient solutions) are all the time at every supply occasion kept substantially at a constant value and are kept equal to the predetermined proportions of the plant at optimal nutrient state. The conductivity value of the cultivation medium is thereby maintained between 20 and 2,000, preferably between 100 and 1,000$\mu$ S/cm. (also expressed as $10^{-6}$ ohm$^{-1}$/cm. wherein S (Siemens)=ohm$^{-1}$) and the pH-value of the cultivation medium is maintained between 4.5 and 5.5.

The device for carrying out the method comprises a mixing vessel containing the cultivation medium and supply containers for nutrient solutions, said containers being adapted for supplying plant nutrient to the cultivation medium through feed conduits. The device is characterized by pH-controlling apparatus and conductivity controlling apparatus adapted, on the basis of predetermined pH- and conductivity value intervals measured in the cultivation medium, to control the supply of plant nutrient from the supply containers by manipulating feed valves arranged in the feed conduits so as to maintain a substantially constant hydrogen ion and plant nutrient concentration in the cultivation medium.

The invention will be described in detail with reference to the accompanying drawing which shows a diagrammatical picture of a suitable device for carrying out the dosage method described.

In the device shown in the drawing, the plant nutrient is supplied by three separate supply containers 1, 2, 3 which contain different nutrient solutions, e.g. according to the example given below. The supply container 1 contains an alkaline solution, the supply container 2 contains an acid solution and the supply container 3 contains an acid or neutral solution. There extend from the supply containers 1, 2, 3 feed conduits 4, 5, 6 which discharge into a mixing vessel 8 containing the cultivation medium, said mixing vessel 8 being provided with a stirring device 7. The feed conduits 4, 5, 6 are each provided with their feed valve 9, 10 and 11, respectively, the feed valves 9 and 11 being controlled by a pH-controlling device comprising a pH-meter 12 and a galvanometric regulator 13, and the feed valves 10 and 11 being controlled by a conductivity controlling device comprising a conductometer 14 and a galvanometric regulator 15. The electrode 16 of the pH-meter 12 and the measuring cell and thermo resistor 17 of the conductometer 14 are immersed in the cultivation medium contained in the mixing vessel 8.

Further, the mixing vessel 8 is provided with a conduit 18 for feeding de-ionized water from a ion-exchanger 19 which is fed with tap water via a conduit 21 provided with a magneto-valve 20, the latter being controlled by a level-sensing device 22 provided in the mixing vessel 8.

A conduit 24 provided with a liquid pump 23 extends from the mixing vessel 8 and the cultivation medium is conveyed through the conduit 24 to one or several cultivation locations (not shown in the drawing). The solution poorer in nutrient substances returned from the cultivation locations is recirculated via a conduit 25 to the mixing vessel 8. The mixing vessel 8 in combination with the conduits 24 and 25, through which the medium is continuously recirculated from the bed in which the plants are cultivated, and the hydrogen ion and conductivity regulating devices coupled with the supply containers 1, 2 and 3 provide a control zone for automatically maintaining the hydrogen ion concentration and conductivity values within the ranges corresponding to optimum growth.

The values measured by the pH-meter 12 and the conductometer 14 are recorded on a recorder 26.

At the beginning of the cultivation process the cultivation medium has the correct plant nutrient concentration corresponding to a conductivity value between 200 and 600μ S/cm. and a pH-value of 5.0. As the nutriment is gradually absorbed by the plants at the consumption locations the pH-value and the conductivity value are changed in the cultivation medium. The pH-controlling device is then adjusted in such a way that the feed valves 9 and 11 are opened when the pH-value measured in the cultivation medium is <4.5 and they are closed at a pH-value which is >5.5.

The conductivity controlling device is adjusted in such a way that the feed valves 10 and 11 are opened at a conductivity value measured in the cultivation medium that is ≦200μ S/cm. and are closed at a conductivity value which is ≧600μ S/cm.

By means of this cooperation of the measuring of the pH-value and the conductivity value there is obtained a completely automatic dosage process while maintaining a substantially constant nutritive composition in the cultivation medium.

The composition of the plant nutrient may be modified with regard to suitable salts and included proportions of the elements as described in the U.S. application No. 561,377, now abandoned, i.e. the element proportions of the nutrient supplied at every supply occasion should be kept within following ranges when N equals 100, P: from 8–25, K: from 40–100, Ca: from 4–66.7, Mg: from 4–40 and S: from 6.7–33.3.

It will be apparent from the above description of the device that the plant nutrient is supplied by three nutrient solutions, the composition and preparation of which will be clear from the following example. The invention is in no way limited to the example.

Nutrient solution No. 1 (alkaline) contained in the supply container 1

|  | Grams |
|---|---|
| NH$_4$OH (26.71%) | 147.8 |
| KH$_2$PO$_4$ | 28.6 |
| K$_2$SO$_4$ | 24.5 |
|  | 200.9 |

The potassium dihydrogen phosphate and the potassium sulphate are dissolved in about 500 milliliters of distilled water and the ammonium hydroxide is thereupon added and the solution is diluted by means of distilled water to 1000 milliliters.

Nutrient solution No. 2 (acidic) container in the supply container 2

|  | Grams |
|---|---|
| NH$_4$NO$_3$ | 92.8 |
| KH$_2$PO$_4$ | 28.6 |
| K$_2$SO$_4$ | 24.5 |
|  | 145.9 |

The ammonium nitrate is dissolved in about 500 milliliters of distilled water which has been heated to 60–65° C. and then the potassium dihydrogen phosphate and the potassium sulphate are added. The solution is diluted at ambient temperature with distilled water to 1000 milliliters.

Nutrient solution No. 3 contained in the supply container 3

|  | Grams |
|---|---|
| KNO$_3$ | 34.40 |
| NH$_4$NO$_3$ | 14.40 |
| HNO$_3$ (65.48%) | 2.45 |
| Mg(NO$_3$)$_2$·6H$_2$O | 44.90 |
| Ca(NO$_3$)$_2$·4H$_2$O | 20.60 |
| Trace substances | 3.84 |
|  | 120.59 |

The ammonium nitrate is dissolved in about 500 milliliters of distilled water which has been heated to 60–65° C. and then the potassium nitrate, the magnesium nitrate and the calcium nitrate are added. To the salt solution there is added nitric acid and the trace substances, and the solution is diluted at ambient temperature with distilled water to 1000 milliliters.

The mixture of trace substances contains the following components:

|  | Grams |
|---|---|
| Fe(NO$_3$)$_2$·9H$_2$O | 155.30 |
| MnSO$_4$·H$_2$O | 38.42 |
| ZnSO$_4$·7H$_2$O | 5.12 |
| H$_3$BO$_3$ | 38.22 |
| CuCl$_2$·2H$_2$O | 2.56 |
| NaMoO$_4$·2H$_2$O | 0.52 |
|  | 240.14 | and is prepared as follows. Boric acid is dissolved in about 500 milliliters of distilled water while being heated and then the rest of the salts are added. The solution is cooled to ambient temperature and is diluted with distilled water to 1000 milliliters. 16 milliliters of the mixture of trace substances thus obtained corresponds to the amount of trace substances indicated in the nutrient solution No. 3.

In the example, the amounts of the ingredients are determined in such a way that at every supply occasion requisite quantities of the nutrient solutions Nos. 1, 2 and 3, respectively are supplied to the mixing vessel. Furthermore, the amounts of the ingredients are determined in such a way that the proportions of the elements of the supplied nutrient are substantially the same at every supply occasion, i.e. the element proportions of the nutrient solutions Nos. 1 and 3 being supplied to the cultivation medium are the same as the element proportions of nutrient solutions Nos. 2 and 3 being supplied to the cultivation medium, said element proportions being determined so as to fall within the ranges wherein the quantity of nitrogen is 4–12.5 times greater than that of phosphorus, 1–2.5 times greater than that of potassium, 1.5–25 times greater than that of calcium, 2.5–25 times greater than that of magnesium and 3–15 times greater than that of sulfur, as indicated in the U.S. application No. 561,377.

The device described in the foregoing could of course be modified in many ways e.g. in respect of the composition of the plant nutrient and its dividing-up into different nutrient solutions. Thus, the nutrient solution No. 3 described in the foregoing may be partly divided on the other nutrient solutions or be divided on a further number of solutions but then attention is to be paid that the determined element proportions are maintained. Thus, the nutrient may be divided on four nutrient solutions, said first solution containing ammonium hydroxide, said second solution containing ammonium nitrate and eventually nitric acid, said third solution containing dihydrogen phosphate and potassium sulphate, said fourth solution containing magnesium nitrate and calcium nitrate, said nutrient solutions being added to the cultivation medium in two portions, said first portion containing said first, third and fourth solutions intended to maintain the pH value of the cultivation medium said second portion containing said second, third and fourth solutions intended to maintain the conductivity value of the cultivation medium.

It will be understood that the pH-controlling portion and the conductivity controlling portion being added to the cultivation medium individually change the hydrogen ion concentration as well as the conductivity of the cultivation medium but the pH-controlling portion is substantially intended to adjust the hydrogen ion concentration of the cultivation medium and the conductivity controlling portion is substantially intended to adjust the conductivity of the cultivation medium.

The plants may (beside being cultivated in the cultivation medium described in the foregoing) be cultivated on beds through which the cultivation medium is made to circulate, the roots of the plants then being arranged in sand, pebbles or the like. By means of variations in the cultivation medium and the concentrations of the plant nutrient it is rendered possible to satisfy the most different sizes and kinds of cultivations and it is also possible to achieve some special effects in this manner.

The pre-adjusted intervals of the conductivity value and the pH-value are easily determined for every kind of plants but for most plants an optimal growth is generally obtained within a pH-interval of 3–8 preferably 4.5–5.5 and an interval of the conductivity value within 20–2000, preferably 100–1000$\mu$ S/cm.

We claim:

1. In the method for stimulating the increment and yield of plants cultivated in a bed by means of admission of mineral nutriment in the form of a liquid cultivation medium consisting essentially of water and a salt mixture providing the nutrients nitrogen, phosphorus, potassium, calcium, magnesium, and sulphur, the improvement which comprises automatically maintaining a substantially constant nutrient composition in said medium on the basis of hydrogen ion concentration and conductivity corresponding to predetermined nutrient proportions present at optimum growth, said medium being continuously recirculated from the bed through a zone for maintaining predetermined hydrogen ion concentration and conductivity, by automatically supplying mineral nutriment to said medium in at least three nutrient solutions, the first solution being alkaline and containing a portion of said nutrients, the second solution being acidic and containing a portion of said nutrients, and the third solution containing the remainder of said nutrients, said solutions, having the predetermined nutrient proportions for optimum growth, controlling the hydrogen ion concentration and conductivity in the cultivation medium continuously measuring the pH of said cultivation medium, and responsive to any change thereto, automatically adding a sufficient quantity of said first and said second nutrient solutions to maintain pH between 4.5 and 5.5, and continuously measuring the conductivity of said cultivation medium, and responsive to any change in conductivity adding a sufficient quantity of said second and third solutions to maintain conductivity between 200 and 600 $10^{-6}$ ohm$^{-1}$/cm.

2. A method as described in claim 1 in which said first and said second solutions each contain nutrient salts providing nitrogen, potassium, phosphorus, and sulphur and said third solution contains nutrient salts providing nitrogen, potassium, magnesium and calcium.

3. A method as described in claim 1 in which the alkalinity of solution one is maintained by an excess of $NH_4OH$, and the acidity of said second solution is maintained by the presence of $NH_4NO_3$ and $HNO_3$.

4. A method as described in claim 2 in which said first solution contains $NH_4OH$, $KH_2PO_4$ and $K_2SO_4$; said second solution contains $NH_4NO_3$, $KH_2PO_4$ and $K_2SO_4$; and said third solution contains $KNO_3$, $NH_4NO_3$, $HNO_3$, $Mg(NO_3)_2$, $Ca(NO_3)_2$ and trace substances used in plant cultivation.

References Cited

UNITED STATES PATENTS

| | | | |
|---|---|---|---|
| 1,450,023 | 3/1923 | Edelman | 23—230X |
| 1,759,996 | 5/1930 | Parker | 23—230(a)X |
| 2,607,718 | 8/1952 | Suthard | 23—230(A)X |
| 2,638,419 | 5/1953 | Robichaux | 23—230(A)X |
| 2,917,380 | 12/1959 | Franklin | 71—34 |
| 2,747,331 | 5/1956 | Steiner | 47—1.2 |

OTHER REFERENCES

Soil, the yearbook of Agriculture, 1957, the U.S. Dep't. of Agriculture, published by U.S. Gov't. Printing Office, pages 80 and 84.

Ellis et al.: Soilless Growth of Plants, 2nd. edition, 1947, pages 155–160, Reinhold Publishing Corp., New York.

REUBEN FRIEDMAN, Primary Examiner

B. H. LEVENSON, Assistant Examiner

U.S. Cl. X.R.

23—230, 253; 47—1.2